(12) United States Patent
Okuhira et al.

(10) Patent No.: US 7,223,821 B2
(45) Date of Patent: May 29, 2007

(54) CURABLE RESIN COMPOSITION

(75) Inventors: Hiroyuki Okuhira, Kanagawa Prefecture (JP); Akihito Kanemasa, Kanagawa Prefecture (JP); Hiroyuki Hosoda, Kanagawa Prefecture (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 120 days.

(21) Appl. No.: 10/748,281

(22) Filed: Dec. 31, 2003

(65) Prior Publication Data

US 2004/0167275 A1    Aug. 26, 2004

(30) Foreign Application Priority Data

Jan. 6, 2003    (JP)    ............... 2003-000459

(51) Int. Cl.
*C08L 63/00*    (2006.01)
*C08L 75/00*    (2006.01)

(52) U.S. Cl. ..................... 525/528; 525/476
(58) Field of Classification Search ................ 528/60, 528/61, 68, 69, 87
See application file for complete search history.

(56) References Cited

U.S. PATENT DOCUMENTS 3,627,722 A * 12/1971 Seiter .............. 524/869
4,567,228 A * 1/1986 Gaa et al. ............. 524/588
4,847,319 A * 7/1989 Bandlish ............... 524/589
5,854,338 A * 12/1998 Hovestadt et al. ......... 524/591
5,919,860 A * 7/1999 Roesler et al. ............. 524/838
6,015,475 A * 1/2000 Hsieh et al. ............. 156/331.4

FOREIGN PATENT DOCUMENTS

| DE | 59102651 | * | 9/1994 |
| JP | 09-169829 | A1 | 6/1997 |
| JP | 10-183058 | A1 | 7/1998 |
| JP | 11-322894 | A1 | 11/1999 |
| JP | 2001214144 | A * | 8/2001 |
| JP | 2001240844 | A * | 9/2001 |
| JP | 2002-037841 | A1 | 2/2002 |

* cited by examiner

*Primary Examiner*—Marc S. Zimmer
(74) *Attorney, Agent, or Firm*—Connolly, Bove, Lodge & Hutz, LLP

(57) ABSTRACT

To provide a two-pack type curable resin composition capable of securing a sufficient working life and having excellent curing property, in particular, deep curing property. The two-pack type curable resin composition includes: a first liquid containing a silyl group-denatured urethane prepolymer having an isocyanate group and an alkoxysilyl group in one molecule thereof and a weight average molecular weight of 500 or more; and a second liquid containing a curing agent.

2 Claims, No Drawings

CURABLE RESIN COMPOSITION

BACKGROUND OF THE INVENTION

1. Field of the Invention

The present invention relates to a two-pack type curable resin composition used for adhesive, sealing agent, etc. In particular, the present invention relates to a two-pack type curable resin composition capable of securing a sufficient working life and having excellent curing property.

2. Description of the Related Art

The polyisocyanate compound forms a three-dimensional cross-linked structure through a reaction with a curing agent such as amine to thereby provide a polyurethane cured product that is high in strength, elongation, abrasion resistance, and grease resistance. Therefore, the polyisocyanate compound is used as a main ingredient for a joint compound, sealant, adhesive, etc.

An isocyanate group of the polyisocyanate compound generally has high reactivity, and if it is mixed with a curing agent such as amine, the compound reacts therewith immediately. Thus, the mixture (composition) of the polyisocyanate compound and the curing agent gelates or cures before use, causing a serious problem in practical use.

As techniques to solve the problem, there are proposed various compositions such as one-pack type composition and two-pack type composition employing amines having low reactivity or potential curing agents generating amine and the like under certain conditions (see, e.g., JP 10-183058 A and JP 9-169829 A).

For example, a two-pack type curable resin composition including the potential curing agent and a main agent containing a resin ingredient such as urethane prepolymer (polyisocyanate compound) solves the problem on gelation or curing to some extent due to the characteristics of the potential curing agent.

The composition obtained after mixing the curing agent and the main agent, however, has the same formulation as that of a one-pack composition containing the curing agent and the main agent after all, and is also cured by the same curing method as the method of curing the one-pack composition. Thus, the two-pack type composition described above has a similar problem as that on the one-pack composition. That is, in the case of the two-pack type composition, the curing reaction generally starts from the composition surface that contacts with moisture similar to the case of the one-pack composition. Thus, while the surface of the composition shows excellent curing property, the curing reaction in the deep (inner) portion of the composition, which does not contact with moisture is unlikely to occur, resulting in a problem of poor curing property (see, e.g., JP 11-322894 A).

Alternately, there is known a method in which an epoxy resin is incorporated into a resin ingredient of a main agent for the purpose of increasing mechanical characteristics (tensile strength, breaking strength, breaking elongation, etc.), adhesive property, etc. of a composition and a cured product. In the case of using a ketimine compound which is activated by moisture as a curing agent in the method, a similar problem as above occurs likewise (see, e.g., JP 2002-37841 A)

As explained above, in a two-pack type urethane-based curable resin composition including a first liquid containing a resin ingredient and a second liquid containing a curing agent, securing a time during which the composition is allowed to be used without gelation or curing after mixing the first liquid and the second liquid (when used as an adhesive, the time means a time period during which the composition is available for sticking after preparation, and the time is referred herein to as "working life") and acquiring excellent curing property (particularly, deep curing property) have contrary characteristics respectively, and there has not been known a curable resin composition satisfying both of these characteristics in a high level.

SUMMARY OF THE INVENTION

Therefore, an object of the present invention is to provide a two-pack type curable resin composition capable of securing a sufficient working life and having excellent curing property, in particular, deep curing property.

As a result of intensive study to attain the above-mentioned object, the inventors of the present invention have found that denaturing a part of an isocyanate group contained in a urethane prepolymer as a resin ingredient with an alkoxylsilyl group allows to keep curing property by the reaction between a curing agent and the residual isocyanate group, and to secure the working life because gelation or curing immediate after preparing the composition (after mixing of the two liquids) is inhibited due to a gentle progress of a three-dimensional cross-linking reaction derived from the above reaction and a condensation reaction of the alkoxysilyl group.

The present inventors have completed the present invention based on the above findings.

Thus, the present invention provides items (1) to (6) below.

(1) A two-pack type curable resin composition including: a first liquid containing a silyl group-denatured urethane prepolymer having an isocyanate group and an alkoxysilyl group in one molecule thereof and a weight average molecular weight of 500 or more; and a second liquid containing a curing agent.

(2) The curable resin composition according to the item (1), in which the silyl group-denatured urethane prepolymer is a reaction product obtained by reacting a polyisocyanate compound having two or more isocyanate groups in one molecule thereof; and a silane compound having a primary or secondary amino group and an alkoxysilyl group in one molecule thereof.

(3) The curable resin composition according to the item (1), in which the isocyanate group of the silyl group-denatured urethane prepolymer bonds to a secondary or tertiary carbon atom and the curable resin composition according to the item (2), in which the isocyanate group of the polyisocyanate compound bonds to a secondary or tertiary carbon atom.

(4) The curable resin composition according to any one of the items (1) to (3), in which the first liquid further contains an epoxy resin.

(5) The curable resin composition according to any one of the items (1) to (4), in which the second liquid contains a polyamine compound as the curing agent.

(6) The curable resin composition according to the item (5), in which the second liquid further contains an alkoxysilyl group-condensation catalyst as the curing agent.

DETAILED DESCRIPTION OF THE PREFERRED EMBODIMENT

The present invention will be described in detail hereinafter.

A curable resin composition according to the present invention (hereinafter referred simply to as "composition of the present invention") is a two-pack type curable resin composition including: a first liquid containing a silyl group-denatured urethane prepolymer having an isocyanate group and an alkoxysilyl group in one molecule thereof and a weight average molecular weight of 500 or more; and a second liquid containing a curing agent, preferably, a two-pack type curable resin composition, in which the first liquid further contains an epoxy resin and the second liquid further contains a polyamine compound, more preferably, an alkoxysilyl group-condensation catalyst.

The resin ingredient used in the composition of the present invention is a silyl group-denatured urethane prepolymer having an isocyanate group and an alkoxysilyl group in one molecule, and having a weight average molecular weight of 500 or more.

Employing the silyl group-denatured urethane prepolymer realizes a curable resin composition capable of securing a sufficient working life and having excellent curing property, in particular, deep curing property.

An existence ratio of the isocyanate group and the alkoxysilyl group is not particularly limited so long as one each group is present in one molecule on average, while the existence ratio is preferably an existence ratio obtained by the reaction ratio of a polyisocyanate compound and a silane compound, described below. For example, the existence ratio of the isocyanate group and the alkoxysilyl group (isocyanate group/alkoxysilyl group) is in a range of 100/190 to 100/2.5. Appropriately changing the ratio allows to control the balance between the working life and the curing property desirably. In the case where the ratio of the isocyanate group and the alkoxysilyl group is in the above range, the composition does not thickens excessively even after mixed with the curing agent, particularly polyamine compounds while the curing reaction of the alkoxysilyl group proceeds slowly, resulting in achieving a balance between the working life and the curing property in a high level.

The molecular weight of the urethane prepolymer is 500 or more, preferably 800 or more, particularly preferably 1000 or more. In the case where the molecular weight is less than 500, the modulus of the cured product is high such that the flexibility of the cured product may be lost.

The silyl group-denatured urethane prepolymer preferably has the isocyanate group bonded to a secondary or tertiary carbon atom.

Bonding of the isocyanate group to the secondary or tertiary carbon atom inhibits the activity of the isocyanate group, thereby improving the storage stability of the first liquid. Thus, even if the first liquid after a long-term storage is used with being mixed with the second liquid described below, the composition keeps showing excellent curing property. The isocyanate group preferably bonds to a tertiary carbon atom, because these characteristics are particularly excellent.

The alkoxysilyl group of the silyl group-denatured urethane prepolymer is not particularly limited so long as it is a silyl group having at least one alkoxy group.

The alkoxy group bonding to a silicon atom of the alkoxysilyl group is not particularly limited, but preferably includes a methoxy group, an ethoxy group and a propoxy group from the viewpoint of the fact that the hydrolysis of the silyl group proceeds rapidly. The group other than the alkoxy group bonding to the silicon atom of the alkoxysilyl group is not particularly limited, but preferably includes a hydrogen atom and an alkyl group, an alkenyl group or an arylalkyl group having 20 or less carbon atoms such as a methyl group, an ethyl group, a propyl group, or an isopropyl group.

Specific examples of the alkoxysilyl group include: a methyldimethoxysilyl group, a dimethylmethoxysilyl group, a trimethoxysilyl group, an ethyldiethoxysilyl group, a diethylethoxysilyl group, a triethoxysilyl group, a tris(2-methoxyethoxy)silyl group, an ethyldimethoxysilyl group, and a methyldiethoxysilyl group.

In particular, the alkoxysilyl group having two or more alkoxy groups is preferable from the viewpoint of excellent physical property of the cured product after cross-linking of the alkoxysilyl group, and preferable examples thereof include a methyldimethoxysilyl group, a trimethoxysilyl group, an ethyldiethoxysilyl group, a triethoxysilyl group, and a tris(2-methoxyethoxy)silyl group.

The silyl group-denatured urethane prepolymer is not particularly limited, so long as it is the one listed above, in its functional group (a bonding group bonding the isocyanate group and the alkoxysilyl group) other than the above, physical property, etc.

The method of manufacturing the silyl group-denatured urethane prepolymer is not particularly limited, but is preferably a method including reacting a polyisocyanate compound having two or more isocyanate groups in one molecule thereof; and a silane compound having a primary or secondary amino group and an alkoxysilyl group in its molecule. If the prepolymer can be prepared through the above reaction, the preparation of the prepolymer can be carried out simultaneously with the preparation of the first liquid, without previously preparing the reaction product.

The polyisocyanate compound having two or more isocyanate groups in one molecule thereof used in the above reaction may be a monomer or a urethane prepolymer obtained by reacting the monomer with a compound having an active hydrogen (in the present invention, referred simply to as "prepolymer").

The monomer of the polyisocyanate compound includes, for example, a polyisocyanate used generally in manufacturing urethane prepolymers. More specifically, the monomer includes, for example, a polyisocyanate having an isocyanate group bonded to a primary carbon atom such as ethylene diisocyanate, propylene diisocyanate, tetramethylene diisocyanate, hexamethylene diisocyanate (HDI), $H_6$ XDI (hydrogenated XDI), or norbornane diisocyanate (NBDI); polyisocyanate having an isocyanate group bonded to a secondary carbon atom such as $H_{12}$ MDI (hydrogenated MDI); a polyisocyanate having isocyanate groups bonded to primary and secondary carbon atoms such as isophorone diisocyanate (IPDI), lysine diisocyanate, or lysine triisocyanate; a polyisocyanate having an isocyanate group bonded to a tertiary carbon atom such as tetramethylxylylene diisocyanate (TMXDI); and a polyisocyanate having an isocyanate group bonded to a carbon atom constructing an aromatic ring such as 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), p-phenylene diisocyanate, polymethylene polyphenylene polyisocyanate, xylylene diisocyanate (XDI), and 1,5-naphthalene diisocyanate.

Also, the monomer includes a carbodiimide-denatured polyisocyanate of each polyisocyanate listed above, an isocyanurate-denatured polyisocyanate thereof, a biulet-denatured polyisocyanate thereof, etc.

Further, an isocyanate compound having at least one isocyanate group having a large steric hindrance may be used. Specifically, CYTHANE (R) (trilsocyanate compound), available from Mitsui Cytec Ltd., is preferably exemplified.

In particular, the polyisocyanate having an isocyanate group bonded to a secondary carbon atom such as $H_{12}$ MDI (hydrogenated MDI); the polyisocyanate having isocyanate groups bonded to primary and secondary carbon atoms such as isophorone diisocyanate (IPDI), lysine diisocyanate, or lysine triisocyanate; and the polyisocyanate compound having an isocyanate group bonded to a tertiary carbon atom such as tetramethylxylylene diisocyanate (TMXDI) are preferable; the tetramethylxylylene diisocyanate is particularly preferable. The activity of the above isocyanate group is inhibited so that the storage stability of the first liquid is improved. Moreover, the composition obtained by mixing the above first liquid after the long-term storage with the second liquid described below is allowed to keep showing excellent curing property.

The prepolymer includes a urethane prepolymer obtained by reacting a generally used compound having an active hydrogen and a monomer of the above polyisocyanate compound.

The compounds having an active hydrogen preferably include a polyetherpolyol, a polyesterpolyol, other polyol and mixed polyol thereof.

The polyetherpolyol includes, for example, a polyetherpolyol obtained by adding one or more kind(s) of propylene oxide, ethylene oxide, butylene oxide, styrene oxide, etc. to one or more kind(s) of polyalcohols such as ethylene glycol, diethylene glycol, propylene glycol, dipropylene glycol, 1,3-butanediol, 1,4-butanediol, 4,4'-dihydroxyphenylpropane, 4,4'-dihydroxyphenylmethane, glycerin, 1,1,1-trimethylolpropane, 1,2,5-hexanetriol, or pentaerythritol. To be specific, a polytetramethyleneglycol etc. obtained by a ring-opening polymerization of polyoxypropylene glycol, polyoxyethylene glycol, polyoxypropylenetriol, or tetrahydrofuran are exemplified.

The polyesterpolyol includes, for example, a condensation polymer of one or more kind(s) of ethylene glycol, propylene glycol, butanediol, pentanediol, hexanediol, cyclohexanedimethanol, glycerin, 1,1,1-trimethylolpropane, and other low-molecular polyol and one or more kind(s) of glutaric acid, adipic acid, pimelic acid, suberic acid, sebacic acid, terephthalic acid, isophthalic acid, dimer acid, and other low-molecular carboxylic acids and oligomer acids; and a ring-opening polymer such as propionelactone, valerolactone, and caprolactone.

Other polyol includes a polymer polyol; a polycarbonate polyol; a polybutadiene polyol; a hydrogenated polybutadiene polyol; an acrylic polyol; ethylene glycol; diethylene glycol; propylene glycol; dipropylene glycol; and a low-molecular polyhydric polyol such as 1,3-butanediol, 1,4-butanediol, 4,4-dihydroxyphenylpropane, 4,4'-dihydroxyphenylmethane, glycerin, 1,1,1-trimethylolpropane (TMP), 1,2,5-hexanetriol, or pentaerythritol.

Of those, a polyetherpolyol having a number average molecular weight of 500 to 15000 is preferred in terms of particularly excellent physical property after curing and availability.

The above polyol may be used singly or in combination of two or more kinds thereof.

The prepolymer described above can be obtained by reacting a compound having an active hydrogen and an excess amount of polyisocyanate compound. The mixing ratio of the compound having an active hydrogen and the polyisocyanate compound is set such that the equivalent ratio of the isocyanate group in the polyisocyanate compound to the active hydrogen in the compound having the active hydrogen is preferably 1.3 to 2.5, more preferably 1.7 to 2.3. In the above range, the viscosity of the prepolymer is appropriate; therefore, the prepolymer is excellent in processability and easy to handle.

The prepolymer can be manufactured using a usual method of manufacturing a urethane prepolymer. For example, the prepolymer can be obtained by heating with stirring the compound having an active hydrogen and the polyisocyanate which are mixed in the amount ratio described above under ambient pressure at 50° C. to 100° C. If needed, a urethanization catalyst such as an organic tin compound, an organic bismuth and an amine may be used.

The above prepolymer may be the one that is commercially available.

The above prepolymer may be used singly or in combination of two or more kinds thereof.

The polyisocyanate compound used in the present invention is preferably the prepolymer among the above ones, and specifically, is preferably a urethane prepolymer obtained by reacting IPDI or TMXDI and the above polyol in the equivalent ratio of the isocyanate group of IPDI or TMXDI to the hydroxyl group of the polyol (NCO/OH) of 1.7 to 2.3.

The silane compound above having a primary or secondary amino group and an alkoxysilyl group in its molecule is not particularly limited, and the alkoxysilyl group is basically similar to the alkoxysilyl group explained above. The amino group is not particularly limited so long as it is a primary or secondary amine. The groups other than the alkoxysilyl group and the amino group are not particularly limited. The silane compound may be a monomer or a polymer compound, but a monomer is preferable in terms of availability.

The monomer of the silane compound is not particularly limited so long as it has an amino group and the silyl group described above, but the monomer is preferably a compound having a structure represented by the following general formula (1) or (2).

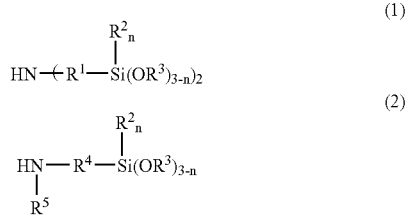

(1)

(2)

(wherein $R^1$ is an alkylene group having 1 to 12 carbon atom(s) and may be branched; $R^2$ and $R^3$ are alkyl groups having 1 to 8 carbon atom(s) and may be branched independently, and are the same or different from each other; $R^4$ is an alkylene group having 1 to 12 carbon atom(s) and may be branched; $R^5$ is a hydrogen atom, a linear or branched alkyl group having 1 to 8 carbon atom(s) which may have an amino group, a linear or branched aralkyl group having 7 to 18 carbon atoms which may have an amino group, or an aryl group having 6 to 18 carbon atoms which may have an amino group; and n is an integer of 0 to 2).

In the general formula (1), examples of the alkylene group of $R^1$ having 1 to 12 carbon atom(s) which may be branched includes: a methylene group, an ethylene group, a trimethylene group, a tetramethylene group, a pentamethylene group, a hexamethylene group, an octamethylene group, a decamethylene group, a dodecamethylene group, and a 3,3-dimethylbutylene group. A trimethylene group and a 3,3-dimethylbutylene group (3,3-dimethyl-1,4-butylene group) are more preferable in terms of availability and excellent adhesion.

The alkyl group of $R^2$ and $R^3$ having 1 to 8 carbon atom(s) which may be branched includes, for example, a methyl group, an ethyl group, a propyl group, an isopropyl group, an n-butyl group, an isobutyl group, a sec-butyl group, a tert-butyl group, an n-pentyl group, an isopentyl group, a neopentyl group, a tert-pentyl group, a 1-methylbutyl group, a 2-methylbutyl group, a 1,2-dimethylpropyl group, an n-hexyl group, an n-heptyl group, an n-octyl group, etc.; those groups may include a double bond or a triple bond. Among the above groups, the methyl group and the ethyl group are preferable. Note that $R^2$ and $R^3$ are the same or different from each other.

Also, n is preferably 0 or 1.

The compound represented by the general formula (1) above includes, for example, N,N-bis[(3-trimethoxysilyl)propyl]amine, N,N-bis[(3-triethoxysilyl)propyl]amine, and N,N-bis[(3-tripropoxysilyl)propyl]amine (all available from Nippon Unicar Co., Ltd.).

Alternately, the silane compound preferably includes the silane compound represented by the general formula (2) above, other than the compound represented by the general formula (1) above.

In the general formula (2), $R^2$ and $R^3$, and n are basically similar to those in the general formula (1) above.

The alkylene group of $R^4$ having 1 to 12 carbon atom(s) which may be branched is preferably any of the alkylene groups exemplified by the alkylene group $R^1$ of the general formula (1) above. The alkylene group of $R^4$ is more preferably the alkylene group having 2 to 6 carbon atoms which may be branched as exemplified by the general formula (1).

Specific examples of the compound represented by the general formula (2) above wherein $R^5$ is a hydrogen atom, include: γ-aminopropyltrimethoxysilane, γ-aminopropyltriethoxysilane, γ-aminopropylmethyldimethoxysilane, γ-aminopropyldiethoxysilane, and 4-amino-3,3-dimethylbutyltrimethoxysilane (all available from Nippon Unicar Co., Ltd.).

The linear or branched alkyl group of $R^5$ having 1 to 8 carbon atom(s) which may have an amino group includes the alkyl group exemplified by $R^2$ and $R^3$ in the general formula (1) above, an amino group-substituted product of the alkyl group, etc.

The alkyl group includes, for example, the alkyl group exemplified by $R^2$ and $R^3$, and an amino group-substituted products such as an aminomethyl group, an aminoethyl group, an aminopropyl group, an aminoisopropyl group, an aminobutyl group, and an aminohexyl group. In particular, a linear or branched alkyl group having 2 to 4 carbon atoms or an amino group-substituted product of an aminomethyl group, an aminoethyl group, an aminopropyl group, etc. is preferable.

Specific examples of the compound represented by the general formula (2) above wherein $R^5$ is a linear or branched alkyl group having 1 to 8 carbon atom(s) which may have an amino group, include: 3-(n-butylamino)propyltrimethoxysilane (Dynasilane 1189, available from Degussa-Huls GmbH), N-β(aminoethyl)γ-aminopropylmethyldimethoxysilane, N-β(aminoethyl)γ-aminopropyltrimethoxysilane, and N-β(aminoethyl)γ-aminopropyltriethoxysilane.

The linear or branched aralkyl group of $R^5$ having 7 to 18 carbon atoms which may have an amino group includes a benzyl group, a phenethyl group, etc.

The aryl group of $R^5$ having 6 to 18 carbon atoms which may have an amino group includes a phenyl group, a methylphenyl group (tolyl group), a dimethylphenyl group, an ethylphenyl group, etc. The substituent for the aryl group includes an alkoxy group such as a methoxy group and an ethoxy group, and a group including a halogen atom such as a fluorine atom or a chlorine atom, other than the alkyl group and the amino group described above. The aryl group may have one or two or more of the substituents and the substitution position(s) thereof is(are) not limited.

Specific examples of the compound represented by the general formula (2) above wherein the $R^5$ is an aryl group having 6 to 18 carbon atoms which may have an amino group, include N-phenyl-γ-aminopropyltrimethoxysilane (available from Nippon Unicar Co., Ltd.).

The silane compound above may be used singly or in combination of two or more kinds thereof.

Of those, γ-aminopropyltrimethoxysilane, γ-aminopropyltriethoxysilane, N-β(aminoethyl)γ-aminopropyltrimethoxysilane, N-β(aminoethyl)γ-aminopropyltriethoxysilane, N,N-bis[(3-trimethoxysilyl)propyl]amine, 3-butylaminopropyltrimethoxysilane, 4-amino-3,3-dimethylbutyltrimethoxysilane, and N-phenyl-γ-aminopropyltrimethoxysilane are preferable.

The reaction of the polyisocyanate compound above and the silane compound above may be conducted simultaneously with the preparation of the first liquid above, while the reaction product from both compounds may be prepared in advance.

In the case, both of the compounds are mixed together in a solvent such as toluene or in the absence of solvent with stirring for about 5 minutes to 10 hours. The reaction temperature is preferably the ambient temperature. In the reaction, a catalyst is not especially required, while the reaction may be carried out in the presence of an organic metal catalyst such as organic tin, organic titanium, or organic bismuth. The reaction ratio of the polyisocyanate compound and the silane compound in the reaction will be described below.

The silyl group-denatured urethane prepolymer thus obtained includes, for example, a compound obtained by an addition reaction of any of the preferable polyisocyanate compounds described above and any of the preferable silane compounds described above.

Specifically, the urethane prepolymer preferably includes, for example, a silyl group-denatured urethane prepolymer obtained by an addition reaction of a urethane prepolymer obtained by a reaction of IPDI or TMXDI and the above polyol at the equivalent ratio of the isocyanate group of the IPDI or TMXDI to the hydroxyl group of the polyol (NCO/OH) of 1.7 to 2.3, and one or more kind(s) of silane compound selected from the group consisting of γ-aminopropyltrimethoxysilane, γ-aminopropyltriethoxysilane, N-β(aminoethyl) γ-aminopropyltrimethoxysilane, N-β(aminoethyl) γ-aminopropyltriethoxysilane, N,N-bis[(3-trimethoxysilyl)propyl]amine, 3-butylaminopropyltrimethoxysilane, 4-amino-3,3-dimethylbutyltrimethoxysilane, and N-phenyl-γ-aminopropyltrimethoxysilane.

The above reaction ratio of the polyisocyanate compound and the silane compound is not particularly limited, while the equivalent ratio of the isocyanate group (NCO) of the polyisocyanate compound to the amino group (NH) of the silane compound (NCO/NH) is preferably 100/5 to 100/95, more preferably 100/10 to 100/90, further more preferably 100/15 to 100/60.

In a case that the equivalent ratio is over 100/5, the working life of the composition may not be sufficiently secured. While the lower limit of the equivalent ratio above is not particularly limited, the ratio is preferably 100/95 or more from the viewpoint of the expensiveness of alkoxysilane compounds which increases the cost if used in high content. In the equivalent ratio above, there can be provided a curable resin composition having at least one isocyanate group and at least one alkoxysilyl group on average in one molecule, capable of securing the sufficient working life and having the excellent curing property, in particular, deep curing property.

The composition of the present invention preferably contains an epoxy resin in the first liquid. Thus, the working life of the composition can be more sufficiently secured, and the mechanical property (strength, etc.), adhesion, heat-resistance, etc. of the cured product can be improved. In other words, incorporating the epoxy resin additionally achieves a balance between the working life and the curing property in a high level. In particular, in the above existence ratio of the isocyanate group and the alkoxysilyl group, when the alkoxysilyl group content is low (e.g., NCO/Si is around 100/40 (?) or less), the thickness of the composition may be increased depending on the polyamine compound used, etc. However, incorporating the epoxy resin additionally decreases the concentration of the polyamine compound in the composition, allowing to inhibit thickening of the composition. Therefore, the composition containing an epoxy resin can realize a balance between the working life and curing property in a high level regardless of the existence ratio of the alkoxysilyl group to the isocyanate group.

The epoxy resin is not particularly limited, including, for example, a glycidyl ether type obtained by reacting a polyhydric phenol such as bisphenol A, bisphenol F, bisphenol S, hexahydrobisphenol A, tetramethylbisphenol A, pyrocatechol, resorcinol, cresolnovolac, tetrabromobisphenol A, trihydroxybiphenyl, bisresorcinol, bisphenolhexafluoroacetone, tetramethylbisphenol F, or bixylenol and epichlorohydrin; a polyglycidyl ether type obtained by reacting an aliphatic polyalcohol such as glycerin, neopentyl glycol, ethylene glycol, propylene glycol, butylene glycol, hexylene glycol, polyethylene glycol, or polypropylene glycol and epichlorohydrin; a glycidyl ether ester type obtained by reacting hydroxycarboxylic acid such as p-oxybenzoic acid, or β-oxynaphthoeic acid and epichlorohydrin; a polyglycidyl ester type derived from a polycarboxylic acid such as phthalic acid, methylphthalic acid, isophthalic acid, terephthalic acid, tetrahydrophthalic acid, hexahydrophthalic acid, endomethylenetetrahydrophthalic acid, endomethylenehexahydrophthalic acid, trimellitic acid, or polymerized aliphatic acid; a glycidylaminoglycidyl ether type derived from aminophenol, or aminoalkylphenol; a glycidylaminoglycidyl ester type derived from aminobenzoic acid; a glycidylamine type derived from aniline, toluidine, tribromoaniline, xylylenediamine, diaminocyclohexane, bis aminomethylcyclohexane, 4,4'-diaminodiphenylmethane, or 4,4'-diaminodiphenylsulfone; and in addition, epoxydated polyolefin, glycidyl hydantoin, glycidylalkyl hydantoin, triglycidylcyanurate, etc.; and a monoepoxy compound such as butyl glycidyl ether, phenyl glycidyl ether, alkylphenyl glycidyl ether, benzoic acid glycidyl ester, or styrene oxide, and one kind thereof or a mixture of two or more kinds thereof may be used.

Of those, bisphenol A- and bisphenol F-type epoxy resins are preferable in terms of availability and good balance in the property (performance) of the cured product.

The epoxy resin may be commercially available one or be manufactured. The manufacturing condition is not particularly limited; the epoxy resin may be manufactured under a generally used condition.

The polyamine compound preferably contained in the second liquid of the composition of the present invention as a curing agent is not particularly limited so long as it is a compound having two or more amino groups in the molecule thereof.

The composition of the present invention contains the silyl group-denatured urethane prepolymer described above so that, even if it contains a polyamine compound, it can provide the sufficiently secured working life and the excellent curing property, in particular, deep curing property as the curable resin composition.

Among the polyamine compounds, the compound having an aliphatic primary or secondary amino group or an aromatic amino group is preferable, and the compound having an aliphatic primary or secondary amino group is more preferable. The reactivity of the amino group is high, rendering excellent curing property to the composition.

Further, the polyamine compound is preferably used in a mixture of a low-molecular polyamine compound (monomer) and a high-molecular polyamine compound so that the curing property of the composition is more increased.

The low-molecular polyamine compound includes, for example, an aliphatic diamine such as ethylene diamine, 1,2- or 1,3-propane diamine, 1,4-butane diamine, 1,5-pentane diamine, 1,6-hexane diamine, 1,7-heptane diamin 1,8-octane diamine, 1,9-nonane diamine, 1,10-decane diamine, 1,12-dodecane diamine, 1,14-tetradecane diamine, 1,16-hexadecane diamine, diethylene triamine, triethylene tetramine, tetraethylene pentamine, pentaethylene hexamine, hexamethylene diamine, trimethylhexamethylene diamine, iminobispropylamine, methyl iminobispropylamine, 1,5-diamino-2-methylpentane ("MPMD" available from Du Pont Japan, Ltd.), isophorone diamine, 1,3-bisaminomethylcyclohexane ("1,3BAC" available from Mitsubishi Gas Chemical Company Inc.), 1-cyclohexylamino-3-aminopropane, 3-aminomethyl-3,3,5-trimethyl-cyclohexylamine, or norbornane skeleton dimethyleneamine ("NBDA" available from Mitsui Chemicals, Inc.); an aromatic diamine such as metaxylylene diamine (MXDA), 4,4'-diaminophenylmethane, 2,4'-diaminodiphenylmethane, 3,3'-diaminodiphenylmethane, 3,4'-diaminodiphenylmethane, 2,2'-diaminobiphenyl, 3,3'-diaminobiphenyl, 2,4-diaminophenol, 2,5-diaminoph diamine, m-phenylene diamine, p-phenylene diamine, 2,3-tolylene diamine, 2,4-tolylene diamine, 2,5-tolylene diamine, 2,6-tolylene diamine, or 3,4-tolylnediamine; and polyamine such as various triamines.

The high-molecular polyamine includes, for example, a polypropylene glycol in which the propylene-branched carbon atoms at both ends of the molecule are bonded to amino groups respectively (propylene skeleton diamine such as "JEFFERMINE D230", and "JEFFERMINE D400" (both available from Sun Technochemicals Co., Ltd.), a propylene skeleton triamine such as "JEFFERMINE T403", and a polyether skeleton diamine such as "JEFFERMINE EDR148" (available from Sun Technochemicals Co., Ltd.) (ethylene glycol skeleton diamine)), a polyamideamine ("X2000" available from SANWA CHEMICAL INDUSTRY CO., LTD.), and a urethane skeleton polyamine such as "DAITOCURAR U-4070" available from DAITO SANGYO CO., LTD.

Of those, the low-molecular polyamine compound is preferably norbornane skeleton dimethyleneamine, MXDA, 1,3BAC or the JEFFERMINE series, and the high-molecular polyamine compound is preferably urethane skeleton polyamine, or polyethylene glycol- or polypropylene glycol skeleton diamine, because the compounds listed above are easily available on an industrial scale.

These polyamine compounds may be used alone or in a combination of two or more kinds thereof.

As the mixture of the polyamine compounds above, a combination of the preferred compounds described above is preferably used.

The second liquid of the composition of the present invention preferably further contains an alkoxysilyl group-condensation catalyst as a curing agent, for the purpose of improving the curing speed.

The catalyst includes, for example, a metal carboxylate such as zinc octanate, iron octanate, manganese octanate, tin octanate, zinc naphthenate, iron naphthenate, tin butanate, tin caprylate, and tin oleate; an organic tin compound such as dibutyl tin diacetate, dibutyl tin dioctate, dibutyl tin dilaurate, dibutyl tin dioleate, dioctyl tin dilaurate, diphenyl tin diacetate, dibutyl tin oxide, a reaction product of dibutyl tin oxide and phthalic acid ester, dibutyl tin dimethoxide, and dibutyl(triethoxysiloxy) tin; a tin chelate compound such as dibutyl tin acetyl acetonate; a titanic acid ester such as tetraethoxy titanium, tetrapropoxy titanium, tetrabutoxy titanium, tetra-2-ethylhexyloxy titanium, and tetraisopropenyloxy titanium; a titanium chelate compound such as diisopropoxy titanium bis(acetylacetonate), diisoprpoxy titanium bis(ethylacetoacetate), 1,3-propanedioxy titanium bis(acetylacetonate), 1,3-propanedioxy titanium bis(ethylacetoacetate), and titanium tris(acetylacetonate); a zirconium alkoxide such as tetraisopropoxy zirconium, tetrabutoxy zirconium, and tributoxy zirconium stearate; a zirconium chelate compound such as zirconium tetra(acetylacetonate); an aluminum alkoxide such as triethoxy aluminum, tripropoxy aluminum, and tributoxy aluminum; an aluminum chelate compound such as diisopropoxy aluminum (ethylacetoacetate), aluminum tris(acetylacetonate), and aluminum tris(ethylacetoacetate); a cyclic amine such as trimethylene diamine, morpholine, N-methylmorpholine, 2-ethyl-4-methylimidazole, and 1,8-diazabicyclo[5.4.0]-7-undecene; an amine compound such as 2,4,6-tris(dimethylaminomethyl)phenol; and a reaction product of an excess amount of polyamine and an epoxy compound. Furthermore, known compounds effective to hydrolysis and/or condensation reaction of a silyl group can also be used. The catalyst may be used alone or in a combination of two or more kinds thereof.

Of those, the metal compounds are preferable because they are unlikely to volatilize during storage and handling, and particularly the organic tin compound, the tin chelate compound, and the titanic acid ester are preferable because they provide excellent catalytic performance with a trace amount of composition thereof.

The composition of the present invention includes the first liquid containing the silyl group-denatured urethane prepolymer above and the second liquid containing the curing agent above.

The first liquid contains an epoxy resin preferably in 100 or less parts by mass to 100 parts by mass of the silyl group-denatured urethane prepolymer, more preferably in 0.1 to 80 parts by mass, still more preferably in 0.5 to 50 parts by mass. Incorporating the epoxy resin allows the first liquid to secure more sufficient working life of the composition, and to improve the mechanical property (strength, etc.), adhesion, heat-resistance, etc. of the cured product.

The preparation of the silyl group-denatured urethane prepolymer to be contained in the first liquid may be carried out simultaneously with the preparation of the first liquid. In this case, the manufacturing operation is more facilitated compared to the case of previously preparing the prepolymer. Here, the reaction ratio of the polyisocyanate compound to the above silane compound preferably corresponds to the equivalent ratio at the time of preparing the silyl-denatured urethane prepolymer.

The content of the curing agent in the second liquid is not particularly limited but is preferably set in the following proportion to the resin ingredient contained in the first liquid.

The content of the polyamine compound is set such that the equivalent ratio of the amino group of the polyamine compound to the isocyanate group contained in the silyl group-denatured urethane prepolymer in the first liquid (if containing the epoxy resin, the total amount of the isocyanate group and the epoxy group) is preferably 0.5 to 2.0, more preferably 0.7 to 1.5, especially preferably 0.9 to 1.1. In the range above, the occurrence of the surface tuck in the cured product can be prevented and the property after curing is excellent.

The content of the alkoxysilyl group-condensation catalyst is preferably 0.01 to 5 parts by mass, more preferably 0.05 to 4 parts by mass, especially preferably 0.1 to 3 parts by mass, to 100 parts by mass of the silyl group-denatured urethane prepolymer of the first liquid.

The composition of the present invention may contain various additives such as a reinforcer (filler), a plasticizer, a silane-coupling agent, a pigment, a dye, an age resistor, an antioxidant, an antistat, a flame retardant, a tackifier, a dispersant, a solvent, a thixotropic agent, an ultraviolet absorber, a surfactant (including a leveling agent), a dehydrating agent, and an anti-corrosive agent, resin ingredient, etc. in at least one of the first liquid and the second liquid without departing from the object of the invention.

These various additives and resin ingredients may be generally used ones without any particular limitation when in use.

The method of manufacturing the composition of the present invention is generally, although not particularly limited, a method including kneading sufficiently a first liquid obtained by mixing a polyisocyanate compound, a silane compound, if needed, an epoxy resin, various additives, etc. with an agitator such as a mixer under reduced pressure or inert gas (such as nitrogen) atmosphere, with a second liquid obtained by mixing a curing agent, if needed, various additives, etc. in a similar way in use.

Note that a silyl group-denatured urethane prepolymer may be prepared in advance with the above-described method, instead of the polyisocyanate compound and the silane compound of the first liquid. In this case, the reaction ratio of the polyisocyanate compound and the silane compound is similar to the one described above.

The composition of the present invention may be preferably used in an adhesive, a sealing agent, a coating agent, a paint, etc. that require the sufficient working life and the excellent curing property. Specifically, the composition of the present invention may be preferably used in an adhesive, a sealing agent, a coating agent, and a paint that are used in such fields as construction, automobile, and civil engineering.

The composition of the present invention contains a silyl group-denatured urethane prepolymer so that the curing property is not deteriorated through the reaction between a curing agent and the remaining isocyanate group, and the sufficient working life is allowed to be secured. The composition of the present invention may be cured with moisture, because the composition contains a silyl group-denatured urethane prepolymer.

The silyl group-denatured urethane prepolymer in which an isocyanate group bonds to a secondary or tertiary carbon atom has low activity at the isocyanate group, so that the storage stability of the first liquid is increased. Further, the composition may keep the excellent curing property even in the case of mixing the second liquid described below with the first liquid stored for a long period of time.

Incorporating an epoxy resin in the first liquid allows securing the sufficient working life of the composition and improving the mechanical property (strength etc.), adhesion, heat-resistance, etc. of the cured product.

Thus, having the foregoing properties, the composition of the present invention may be preferably used in an adhesive, a sealant, etc. that require the sufficient working life and the excellent curing property.

EXAMPLES

The present invention will be described in detail hereinafter by way of examples; however, the present invention is not limited to the examples below.

Preparation of Polyisocyanate Compounds (Prepolymers)

A polyether polyol (two-functional polypropylene glycol, number average molecular weight of about 3000, "EXCENOL 3020" available from Asahi Glass Co., Ltd.) and a tetramethylxylylenediisocyanate (available from Mitsui-Cytec Inc.) were reacted according to a normal method in an amount ratio at which the ratio of an isocyanate group to a hydroxyl group (NCO/OH) was 2.0, to obtain a prepolymer 1. The isocyanate group in the prepolymer 1 was 1.9 mass %.

A polyether polyol (three-functional polypropylene glycol, number average molecular weight of about 5000, "EXCENOL 5030" available from Asahi Glass Co., Ltd.) and a tetramethylxylylenediisocyanate (available from Mitsui-Cytec Inc.) were reacted according to a normal method in an amount ratio at which the ratio of an isocyanate group to a hydroxyl group (NCO/OH) was 2.0, to obtain a prepolymer 2. The isocyanate group in the prepolymer 2 was 2.1 mass %.

Preparation of the First Liquid

The prepolymer obtained above, and a silane compound, an epoxy resin and a calcium carbonate (all described below) were introduced into a mixer in a formulation ratio (mass part) shown in Table 1, and sufficiently mixed at ambient temperature under nitrogen atmosphere.

Note that while the silane compound contents are given in a unit of mass part in Table 1, the equivalent ratios of the isocyanate group (NCO) of the prepolymers 1 and 2 to the amino group (NH) of the silane compound (NCO/NH) are 100/60 in Example 1, 100/20 in Example 2, 100/20 in Example 3, 100/20 in Example 4, and 100/40 in Example 5.

Silane compound: γ-aminopropyltrimethoxysilane (available from Nippon Unicar Co., Ltd.)

Epoxy compound: bisphenol A type epoxy resin ("EP-4100E" available from Asahi Denka Co., Ltd., epoxy equivalent of 190)

Preparation of the Second Liquid

A polyamine compound, a tin catalyst (alkoxysilyl group-condensation catalyst), a plasticizer, calcium carbonate and a ketimine compound (all described below) were introduced into a mixer in a formulation ratio (mass part) shown in Table 1, and sufficiently mixed at ambient temperature under nitrogen atmosphere.

Polyamine compound 1: norbornane skeleton dimethyleneamine ("NBDA", available from Mitsui Chemicals, Inc.)

Polyamine compound 2: urethane amine ("DAITOCURAR U-4070", available from DAITO SANGYO CO., LTD., amine equivalent of 1700)

Tin catalyst: dibutyl tin acetate (reagent)

Calcium carbonate: "SEALETS200", available from MARUO CALCIUM CO., LTD.

Plasticizer: diisononyladipate ("DINA", available from MITSUBISHI CHEMICAL CORPORATION)

Synthesis of a Ketimine Compound 100 g of norbornanediamine (NBDA) and 145 g of methylisopropylketone were introduced into a flask together with 100 g of toluene. After reacting the mixture for 15 hours with removing generated water by azeotropy, toluene and excess ketone were removed by distillation to yield a ketimine compound.

Preparation of Compositions of the Present Invention

The first and second liquids obtained above were introduced into a mixer and sufficiently mixed at ambient temperature under nitrogen atmosphere to yield each composition.

Note that the mixing ratio (mass part) of the first and second liquids obtained above in Table 1 was determined based on the equivalent ratio of an amino group of the polyamine compound to an isocyanate group (if containing the epoxy resin, the total amount of the isocyanate group and the epoxy group) contained in the silyl group-denatured urethane prepolymer in the first liquid, and the equivalent ratio was 1.0 for all the examples and the comparative examples.

All the obtained compositions were determined or evaluated for the working life, curing property and deep curing property by the methods below.

Working Life

Each obtained composition was left to stand under conditions of 20° C. and 50% RH, and was determined for the time period (working life) from the time when the composition began to stand alone till the time when the composition could be well applied (stuck) onto joints.

In Comparative Example 1, gelation occurred during preparation of the composition above so that the working life could not be determined. This result is shown as "<1 min" in Table 1.

Note that, while the working life is varied depending on the usage, condition, etc. of the composition and not determined indiscriminately, such a composition as has at least one hour of the working life is considered to be sufficient for a two-pack type curable resin composition.

Deep Curing Property

Each of the obtained compounds was poured inside a stainless steel frame of 5 cm in length, 5 cm in width, and 5 cm in height with preventing air bubbles from being incorporated therein, and the top surface of the composition in contact with the air was evened, to make a test subject. This test subject was stood alone under a condition of 20° C., 55% RH, and this time point was set as an initial time for determining the curing time. The test subject was sectioned together with the frame covering the test subject using a knife 24 hours after the start of the curing reaction, to thereby evaluate it for the presence of surface tuck in the cross section.

The evaluation was conducted while the surface was touched with fingers, and the subject was evaluated as "○" if there was no surface tuck, as "Δ" if there were recognized, but few, surface tucks, and as "X" if there were recognized many surface tucks.

Curing Property Test

The surface of the test subjects in the deep curing property test above were evaluated similarly.

As a result, for all the test subjects, no surface tuck was recognized.

TABLE 1

|  |  | Example | | | | | Comparative Example | |
|---|---|---|---|---|---|---|---|---|
|  |  | 1 | 2 | 3 | 4 | 5 | 1 | 2 |
| First liquid | Prepolymer 1 | 40 | 40 | 60 | 40 | 40 | 40 | 40 |
|  | Prepolymer 2 | 20 | 20 |  | 20 | 20 | 20 | 20 |
|  | Silane compound | 3 | 1 | 1 | 1 | 2 |  |  |

TABLE 1-continued

|  |  | Example | | | | | Comparative Example | |
|---|---|---|---|---|---|---|---|---|
|  |  | 1 | 2 | 3 | 4 | 5 | 1 | 2 |
| Second liquid | Epoxy resin |  | 10 | 10 | 10 | 10 | 10 | 10 |
|  | Calcium carbonate | 60 | 60 | 60 | 60 | 60 | 60 | 60 |
|  | Polyamine compound 1 | 0.2 | 2.7 | 2.6 | 2.7 | 1.9 | 2.7 |  |
|  | Polyamine compound 2 | 15 | 25 | 25 | 25 | 20 | 25 |  |
|  | Ketimine compound |  |  |  |  |  |  | 6.0 |
|  | Tin catalyst | 0.2 |  | 0.1 | 0.1 | 0.1 | 0.1 |  |
|  | Calcium carbonate | 60 | 60 | 60 | 60 | 60 | 60 | 60 |
|  | Plasticizer | 30 | 30 | 30 | 30 | 30 | 30 | 30 |
|  | Working life (hrs) | 3 | 6 | 2 | 1 | 1 | <1 min | >6 |
|  | Deep curing property | ○ | Δ | ○ | ○ | ○ | — | X |

According to the present invention, it is possible to provide a two-pack type curable resin composition capable of securing the sufficient working life and having the excellent curing property, in particular, deep curing property.

Further, the present invention can provide a two-pack type curable resin composition capable of securing more sufficient working life and having excellent mechanical property (strength, etc.), adhesion, heat-resistance, etc. in a cured product, in addition to the above properties.

What is claimed is:

1. A two-pack type curable resin composition comprising:
a first liquid containing an epoxy resin and a silyl group-denatured urethane prepolymer having an isocyanate group and an alkoxysilyl group in one molecule thereof and a weight average molecular weight of 500 or more; and
a second liquid containing a polyamine compound and an alkoxysilyl group-condensation catalyst as a curing agent,
wherein the isocyanate compounds from which the silyl group-denatured urethane prepolymer is derived contain at least one isocyanate group bonded to an aliphatic secondary or tertiary carbon atom.

2. A two-pack type curable resin composition comprising:
a first liquid containing an epoxy resin and a silyl group-denatured urethane prepolymer having an isocyanate group and an alkoxysilyl group in one molecule thereof and a weight average molecular weight of 500 or more; and
a second liquid containing a polyamine compound and an alkoxysilyl group-condensation catalyst as a curing agent,
wherein the isocyanate compounds from which the silyl group-denatured urethane prepolymer is derived contain at least one isocyanate group bonded to an aliphatic secondary or tertiary carbon atom,
wherein the silyl group-denatured urethane prepolymer comprises a reaction product obtained by reacting a polyisocyanate compound having two or more isocyanate groups in one molecule thereof, and a silane compound having a primary or secondary amino group and an alkoxysilyl group in one molecule thereof.

* * * * *